United States Patent
Wong

(10) Patent No.: US 6,865,480 B2
(45) Date of Patent: Mar. 8, 2005

(54) DISPLAY METHOD AND APPARATUS FOR NAVIGATION SYSTEM

(75) Inventor: Winnie Wong, Redondo Beach, CA (US)

(73) Assignee: Alpine Electronics, Inc, Tokyo (JP)

( * ) Notice: Subject to any disclaimer, the term of this patent is extended or adjusted under 35 U.S.C. 154(b) by 0 days.

(21) Appl. No.: 10/174,787

(22) Filed: Jun. 19, 2002

(65) Prior Publication Data

US 2004/0204845 A1 Oct. 14, 2004

(51) Int. Cl.[7] .............................................. G01C 21/00
(52) U.S. Cl. ...................... 701/210; 701/211; 701/209; 701/205; 701/206; 701/202; 340/988; 340/990; 340/995.1; 340/995.13; 340/995.14; 340/995.19; 340/995.2; 340/995.21; 340/995.24
(58) Field of Search ................................. 701/210, 202, 701/205, 206, 209, 211; 340/988, 990, 995.1, 995.13, 995.14, 995.19, 995.2, 995.21, 995.24

(56) References Cited

U.S. PATENT DOCUMENTS

| | | | |
|---|---|---|---|
| 5,699,056 A | * | 12/1997 | Yoshida ....................... 340/905 |
| 5,801,646 A | | 9/1998 | Pena |
| 5,862,510 A | * | 1/1999 | Saga et al. ................... 701/211 |
| 5,908,464 A | * | 6/1999 | Kishigami et al. .......... 701/208 |
| 6,012,012 A | | 1/2000 | Fleck et al. |
| 6,101,443 A | * | 8/2000 | Kato et al. ................... 701/210 |
| 6,150,961 A | | 11/2000 | Alewine et al. |
| 6,151,550 A | | 11/2000 | Nakatani |
| 6,161,092 A | * | 12/2000 | Latshaw et al. ............. 704/270 |
| 6,169,495 B1 | * | 1/2001 | Koike .......................... 701/302 |
| 6,178,374 B1 | | 1/2001 | Mohlenkamp et al. |
| 6,209,033 B1 | * | 3/2001 | Datta et al. .................. 709/224 |
| 6,246,948 B1 | | 6/2001 | Thakker |
| 6,255,963 B1 | | 7/2001 | Heimann et al. |
| 6,256,578 B1 | * | 7/2001 | Ito ............................... 701/200 |
| 6,282,492 B1 | * | 8/2001 | Gorai et al. ................. 701/209 |
| 6,298,301 B1 | | 10/2001 | Kim |
| 6,351,709 B2 | | 2/2002 | King et al. |
| 6,438,561 B1 | | 8/2002 | Israni et al. |
| 6,446,000 B2 | * | 9/2002 | Shimabara ................... 701/209 |
| 6,470,386 B1 | * | 10/2002 | Combar et al. ............. 709/224 |
| 6,526,335 B1 | * | 2/2003 | Treyz et al. .................... 701/1 |
| 6,539,080 B1 | * | 3/2003 | Bruce et al. ............. 379/88.17 |
| 6,542,816 B1 | * | 4/2003 | Ito et al. ...................... 701/209 |
| 6,675,089 B2 | * | 1/2004 | Hirabayashi et al. ....... 701/200 |
| 2004/0150534 A1 | * | 8/2004 | Linn ........................ 340/995.13 |

\* cited by examiner

Primary Examiner—William A. Cuchlinski, Jr.
Assistant Examiner—Olga Hernandez
(74) Attorney, Agent, or Firm—Muramatsu & Associates

(57) ABSTRACT

A display method and apparatus for a navigation system for receiving traffic information and displaying traffic incidents in a manner easily and quickly comprehensible by a user of the navigation system. The navigation system applies various criteria to the traffic incidents and the route to the destination and determines an order of displaying the traffic incidents in accordance with the degrees of severity to the driving to the intended or calculated route to the destination. In other aspect, instead of assigning the listing order, colors are assigned to the traffic incident icons based on the degrees of severity.

29 Claims, 16 Drawing Sheets

FIG. 3A
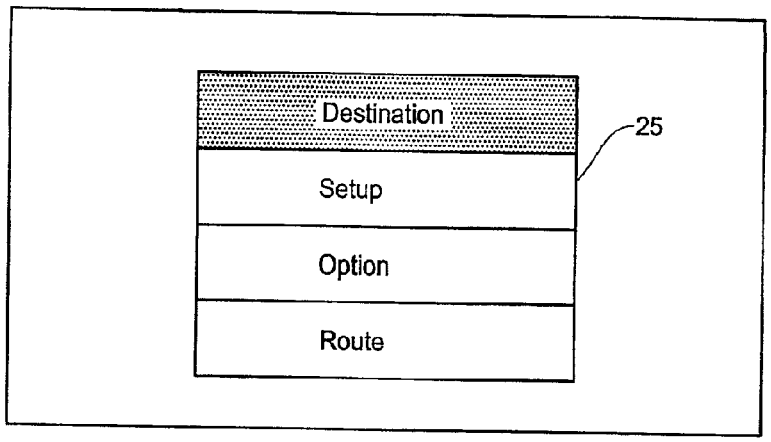
FIG. 3B
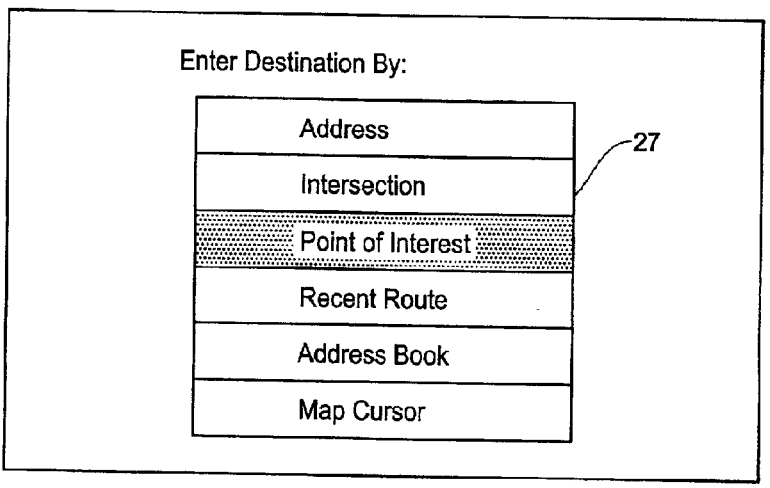
FIG. 3C
Category List — 28
| Recreation | Input Category |
|---|---|
| Bank | Hotel |
| Emergency | Gas Station |
| Restaurant | Shopping |
| Travel | Automotive |
| Park | Theater |

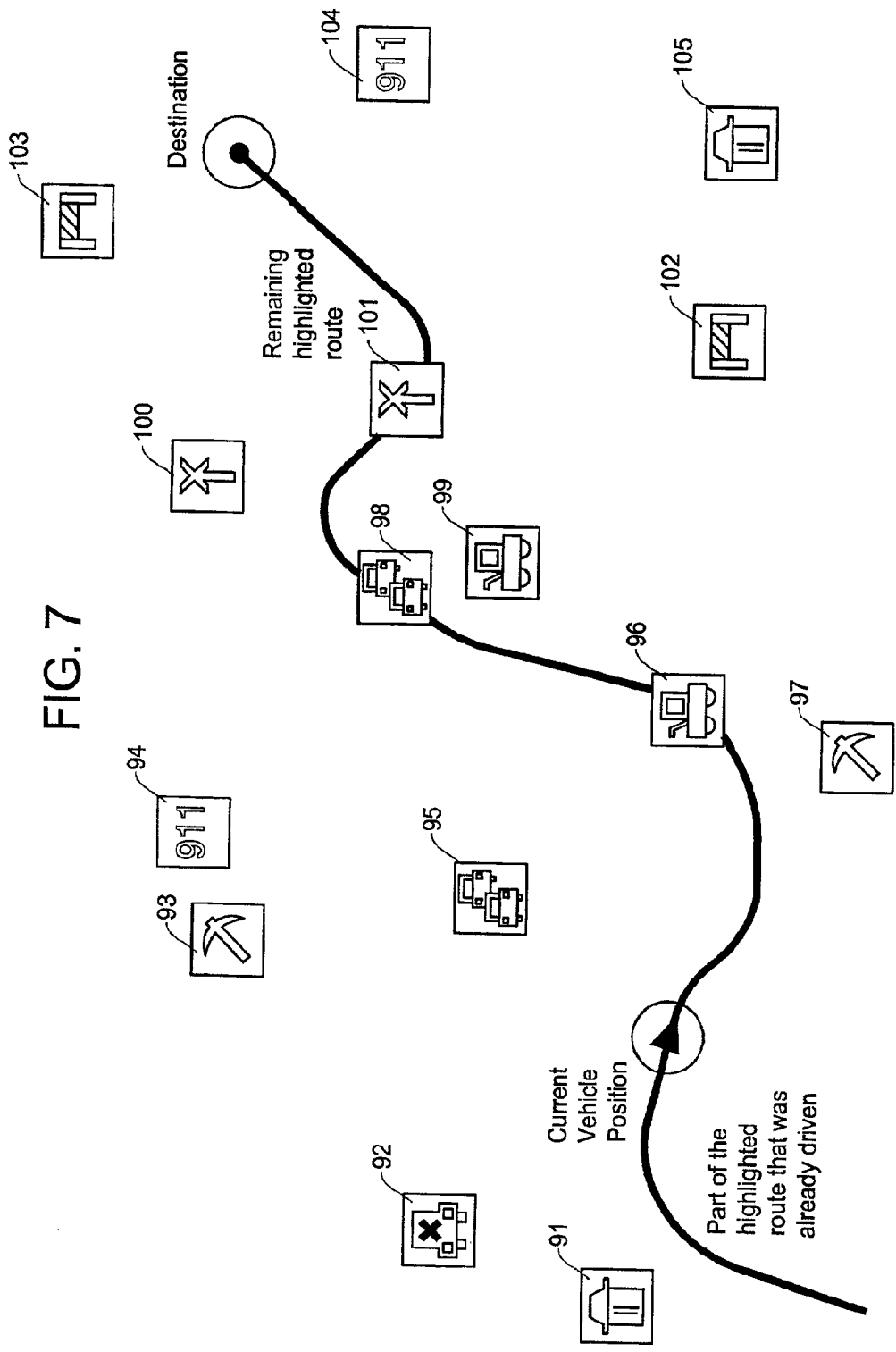

FIG. 12

| | INCIDENTS | mph | mi | lns | ETC |
|---|---|---|---|---|---|
| | I-110N, Stalled vehicle | 25 | 2 | 1 | 3:00p |
| | I-710N, Traffic Jam | 15 | 5 | 3 | 2:30p |
| | Main St., Railway Crossing | 10 | 1 | 3 | 1:15p |
| | I-10E, Traffic Jam | 20 | 3 | 4 | 3:00p |
| | 1st Ave., Construction | 5 | 1.5 | 1 | 6:00p |
| | CA-60W, Stalled vehicle | 5 | 2 | 2 | 1:30p |

Traffic List | Re-calculate Route | Live Video ➡

FIG. 13

Traffic List | Re-calculate Route

| | INCIDENTS | mph | miles | ETC |
|---|---|---|---|---|
| | I-110N, Stalled vehicle<br>2 left lanes blocked | 25 | 2 | 3:00p |
| | | | Live Video ➡ | |
| | I-710N, Traffic Jam | 15 | 5 | 2:30p |
| | | | Live Video ➡ | |
| | Main St., Railway Crossing<br>all lanes blocked | 10 | 1 | 1:15p |

FIG. 14
| | INCIDENTS | mph | mi | ETC | |
|---|---|---|---|---|---|
| | I-110N, Stalled vehicle | 25 | 2 | 3:00p | ☑ |
| | I-710N, Traffic Jam | 15 | 5 | 2:30p | ☑ |
| | Main St., Railway Crossing | 10 | 1 | 1:15p | ☐ |
| | I-10E, Traffic Jam | 20 | 3 | 3:00p | ☐ |
| | 1st Ave., Construction | 5 | 1.5 | 6:00p | ☐ |
Select Traffic Incident to Avoid
FIG. 15
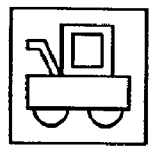 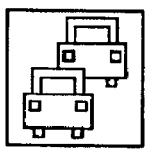 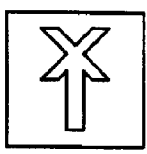 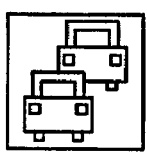 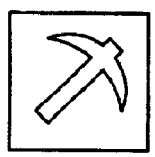
Red    Red    Yellow    Yellow    Green

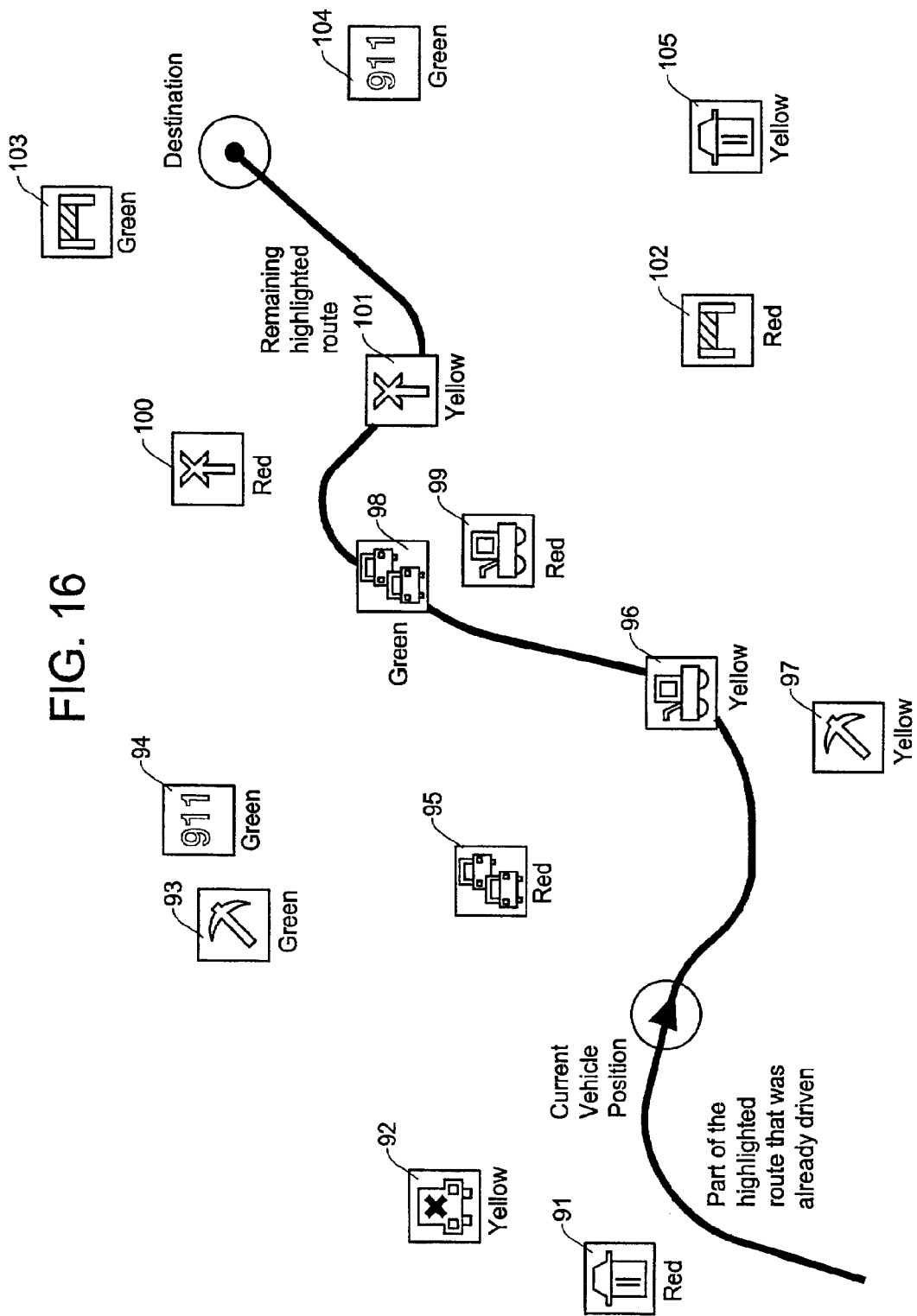

DISPLAY METHOD AND APPARATUS FOR NAVIGATION SYSTEM

FIELD OF THE INVENTION

This invention relates to a display method and apparatus for a vehicle navigation system or a portable navigation system, and more particularly, to a display method and apparatus for receiving traffic information and displaying traffic incidents in a manner easily and quickly comprehensible by a user of such a navigation system.

BACKGROUND OF THE INVENTION

Modern vehicles are equipped with sophisticated electronic devices such as multimedia entertainment systems, GPS navigation systems, internet access devices, and the like. This invention is directed to a display method and apparatus for displaying traffic information which is typically implemented in such vehicle electronic devices, although the present invention is not limited to the automobile use. This invention can also be applied to a hand-held navigation system, remote terminal, PDA (personal digital assistant), etc. However, for the convenience of explanation, the present invention will be made with respect to vehicle navigation system.

When driving an automobile, a user wants to reach the destination quickly and smoothly. However, because of various traffic incidents, such as traffic jams, accidents, construction, etc., it is sometimes difficult to enjoy smooth driving to the destination. Thus, when driving an automobile to the destination guided by a vehicle navigation system, a user wants to know whether there are any traffic incident that affects his/her travel to the destination. If it is possible to know that there is such a traffic incident and its degree of seriousness in advance, the user can change the route or spend a time at a convenient place to avoid such a traffic incident.

Today, there is a radio service which provides traffic information to members through a wireless transmission or a telephone network. If a user is a member of such a service, she is able to receive the ongoing traffic information through the vehicle navigation system, portable navigation device, or the like, if such a device has a radio transmitter or an Internet access capability. For example, such traffic information (depicted by traffic incident icons) will be combined with a map image of an area where the user is currently located.

Especially, when receiving such information by the vehicle navigation system and displaying the traffic information on the navigation screen, it is important that the driver is not distracted when paying attention to the display. To maintain the safe driving, it is necessary that the driver can easily and quickly grasp the important traffic information at a glance. In other words, the traffic incident information that will not affect the travel to the destination should not be displayed in the same manner as the important traffic information.

Thus, there is a need of a new and efficient way to evaluate the traffic information in combination with the specific route to the destination particular to a user. There is a need of a new display method and apparatus for prioritizing the traffic incident information and displaying the resultant traffic information on the navigation system for enabling the user to grasp the information with a short glance of the display. Such an order of priority should be directly associated with the user's particular route to the destination.

SUMMARY OF THE INVENTION

It is, therefore, an object of the present invention to provide a display method and apparatus for navigation system which is capable of evaluating the traffic information and displaying the traffic incidents in the order of importance for a particular user traveling to the destination.

It is another object of the present invention to provide a display method and apparatus for navigation system which is capable of displaying the traffic incidents in a manner that the priority of the incidence can be grasped by the user at a glance at the display.

It is a further object of the present invention to provide a navigation system which is capable of modifying an original route to the destination to avoid the traffic incidents specified by the user.

The navigation system of the present invention is designed to enable a user to quickly observe the traffic information on the navigation screen to fully comprehend the important traffic information at a glance. The navigation system applies various criteria to the traffic incidents and the route to the destination and determines an order of displaying the traffic incidents in accordance with the degrees of severity to the driving to the intended or calculated route to the destination. In other aspect, instead of assigning the listing order, colors are assigned to the traffic incident icons based on the degrees of severity.

More specifically, the method of the present invention includes the steps of: receiving traffic information through a wireless communication device; identifying locations of all of traffic incidents in a coverage area which is dependent upon a current position of the navigation system; calculating a shortest distance from the traffic incident to an intended or calculated route to a destination and marking an intersecting point to the intended or calculated route; prioritizing the traffic incidents based on parameters including the shortest distance and the intersecting point obtained in the foregoing step; and displaying a list of traffic incidents in an order determined by the step of prioritizing the traffic incidents.

The step of prioritizing the traffic incidents includes a step of determining whether the traffic incident is on the intended or calculated route to the destination, and assigning highest priority to the traffic incidents on the intended or calculated route, and listing the traffic incidents on the intended or calculated route in an order of distance from the current position of the navigation system.

The step of prioritizing the traffic incidents includes a step of evaluating the shortest distance for each of the traffic incidents and comparing the shortest distance with a predetermined distance and assigning higher priority to the traffic incidents whose shortest distance is within the predetermined distance, and a step of listing the traffic incidents within the predetermined distance in an order of distance from the current position of the navigation system.

The step of prioritizing the traffic incidents includes a step of evaluating the intersection point and removing the traffic incident from listing in the traffic incident list when the intersecting point is on the intended or calculated route already passed. Preferably, the step of displaying the traffic list includes a step of displaying information on a traffic speed associated with the traffic incident, a traffic length associated with the traffic incident, or an estimated clearance time of the traffic incident.

The step of displaying the traffic incidents includes a step of assigning colors to traffic incidents icons based on the priority determined by the step of prioritizing the traffic incidents. For example, the step of assigning the colors to the traffic incident includes a step of assigning red to the traffic incident in higher priority, yellow to the traffic incident in intermediate priority, and green to the traffic incident in lower priority.

The step of displaying the traffic incidents includes a step of assigning colors to traffic incidents icons based on the traffic information through the wireless communication device indicating a size (length) of an affected area for each traffic incident. For example, the step of assigning the colors to the traffic incident includes a step of assigning red to the traffic incident with a large affected area size, yellow to the traffic incident with an intermediate affected area size, and green to the traffic incident with a small affected area size.

In another aspect, the display method for a navigation system includes the steps of: receiving traffic information through a wireless communication device; identifying locations of all of traffic incidents in a coverage area which is dependent upon a current position of the navigation system; creating a predetermined size of square box centered at a current position of the navigation system; finding a cross point on an intended or calculated route remaining to a destination which intersects with the square box and creating another square box of same size centered at the cross point; repeating the foregoing steps for all of the remaining intended or calculated route; prioritizing the traffic incidents based on parameters including whether or not the traffic incident is within the square boxes created in the foregoing step; and displaying a list of traffic incidents in an order determined by the step of prioritizing the traffic incidents.

A further aspect of the present invention is a display apparatus for a vehicle navigation system. The display apparatus is configured by various means for achieving the display methods described above which apply the various criteria to the traffic incident information and the route to the destination and assign the order of displaying the traffic incidents or colors of the traffic incidents icons.

According to the present invention, the navigation system is capable of displaying the traffic incidents in the manner that the user can grasp the traffic incidents quickly and easily by one or two short glances at the screen. The user can attain the severity of the traffic incidents by the order of listing the traffic incidents or by the color of the traffic incident icons without being affected his/her safe driving. Based on the traffic information on the navigation screen, the user can decide whether to change the route or schedule. The navigation system modifies the original route to the destination to avoid the traffic incidents specified by the user. Accordingly, the user can travel to the destination comfortably and with confidence.

BRIEF DESCRIPTION OF THE DRAWINGS

FIGS. 3A–3F are schematic diagrams showing display examples of a navigation system. FIG. 3A is a main menu, FIG. 3B is a destination set menu, FIG. 3C shows a list of category when setting a point of interest, FIGS. 3D and 3E show name lists in the category specified in FIG. 3C, and FIG. 3F shows a key board display for entering the street name of an address or intersection.

FIG. 7 is a diagram showing an example of image of traffic information received through the wireless communication where various traffic incident icons are provided at the associated locations on the map image around the route to the destination.

FIG. 12 is a diagram showing a further display example for listing the traffic incidents and associated information in the order determined by the present invention.

FIG. 13 is a diagram showing a further display example for listing the traffic incidents and associated information in the order determined by the present invention.

FIG. 14 is a diagram showing an example of selecting the traffic incidents for recalculating the route to the destination by avoiding particular traffic incidents.

FIG. 15 is a diagram showing an example of color assignment to the traffic incident icons based on degrees of severity and seriousness of the traffic incidents.

FIG. 16 is a diagram showing an example of color assignment to the traffic incident icons of FIG. 7 based on the traffic information from the service provider.

DETAILED DESCRIPTION OF THE INVENTION

The display method and apparatus of the present invention will be described in more detail with reference to the accompanying drawings. While the present invention will be described in conjunction with the vehicle navigation system, it will be understood that the present invention is not limited to such a specific application. For example, the present invention can also be applicable to a portable (hand-held) navigation system, a portable data terminal such as a personal digital assistant (PDA), a lap top computer with a navigation function, and the like.

Figure 1A:
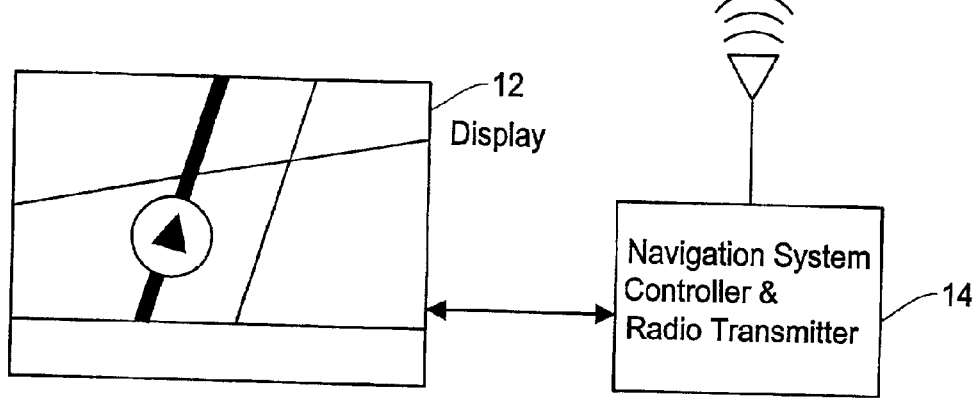
FIGS. 1A and 1B are schematic diagrams showing examples of basic configuration of a navigation system or the like equipped with a radio communication device for receiving wireless information services in accordance with the present invention.
Figure 1B:
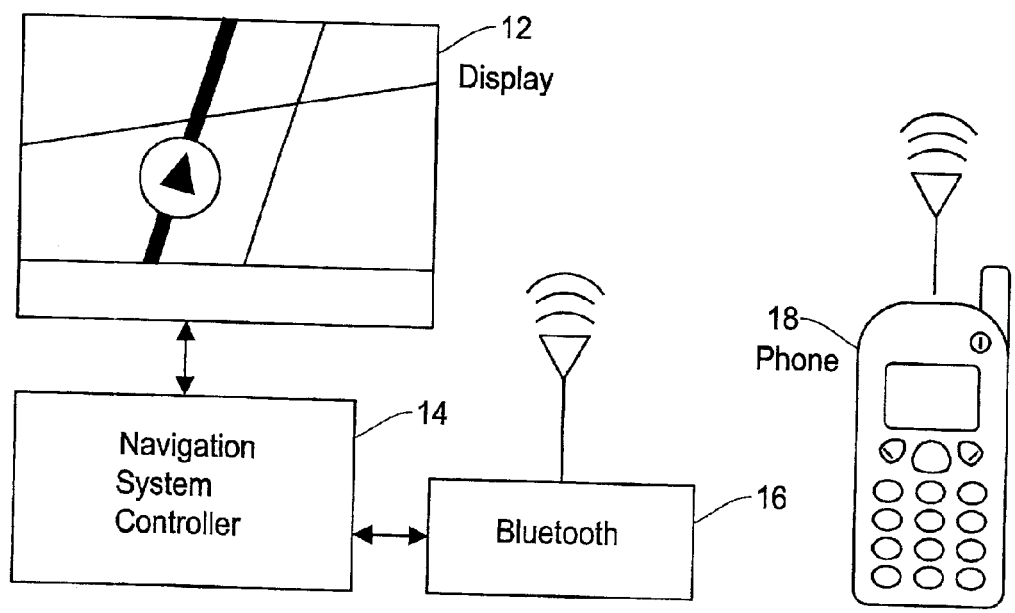

FIGS. 1A and 1B schematically show a basic structure of the navigation system of the present invention. In addition to the basic navigator function, the navigation system of the present invention includes a wireless transmission device for communication with database server and a controller for processing the traffic information. Typically, the navigation system is a vehicle navigation system installed in a vehicle. An example of radio communication device includes a satellite radio transmitter, FM sub-carrier transmitter, a cellular phone, a Bluetooth transceiver or other radio communication method as an embedded or peripheral device.

FIG. 1A is an example of navigation system having a radio transmitter. The example of FIG. 1A shows a display 12 of the navigation system and a navigation system controller 14 with a radio transmitter. The radio transmitter receives various types of information from database servers through wireless communication. There are various databases and transmission methods available at present or in the new future. An example of such database includes information on traffic, movie, sports, news, weather and the like.

FIG. 1B is an example of navigation system which incorporates a short distance radio transmitter such as a Bluetooth transceiver and a Bluetooth compatible cellular phone. The navigation system is formed of a display 12 of the navigation system, a navigation system controller 14, a short distance transmitter 16, and a cellular phone 18. An example of short distance transmitter 16 includes a Bluetooth transmitter (transceiver), an IEEE 802.11b wireless LAN transmitter and a HomeRF transmitter. The short distance wireless transmitter 16 is connected to the navigation system and communicates with the cellular phone 18 to establish long distance radio communication. The cellular phone 18 is designed to be compatible with the Bluetooth or other radio communication protocol noted above.

First, the basic technology involved in a navigation system is described here. Such a navigation system detects the position of a user such as a current vehicle position, reads out map data pertaining to an area at the vehicle current position from a data storage medium, for example, a CD-ROM (compact disk read-only memory) or a DVD (digital versatile disc). The navigation system displays a map image on a monitor screen (display) while superposing a mark representing the current location of the vehicle on a predetermined portion of the map image. The most of the navigation systems today include map data storage and a CPU to perform the route guidance function in the user's side such as in a vehicle. However, it is also possible that the map data and the route guidance function are provided by a navigation server remote from the user so long as a current user's position is known to the navigation server.

The user's position (e.g. current vehicle position) is determined by self-contained navigation sensors (e.g. a distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation function and satellite navigation function to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the map image. In either method, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guided route on a map. When a destination is input, a CPU in the navigation system determines a most suitable route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance from an intersection it is approaching, an intersection guidance diagram (an enlarged or highlighted intersection diagram with an arrow indicating the direction in which the vehicle is to turn at the intersection) is displayed to inform a driver of the correct road and direction at the intersection.

Figure 2A:
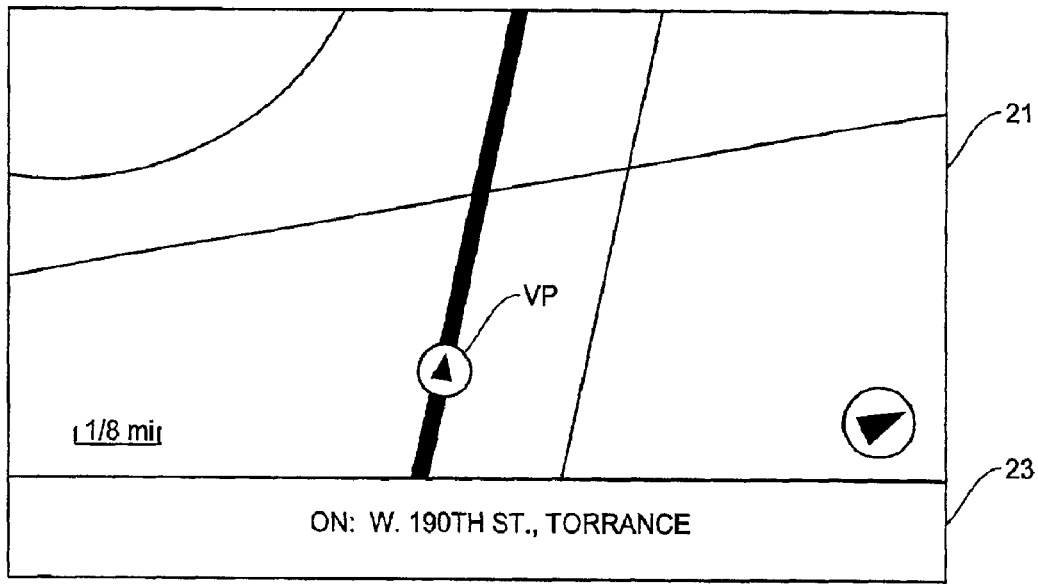
FIGS. 2A and 2B are schematic diagrams showing an example of locator map display and route guidance display, respectively, of a navigation system.

FIG. 2A shows an example of a locator map display containing a current vehicle position mark VP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

Figure 2B:
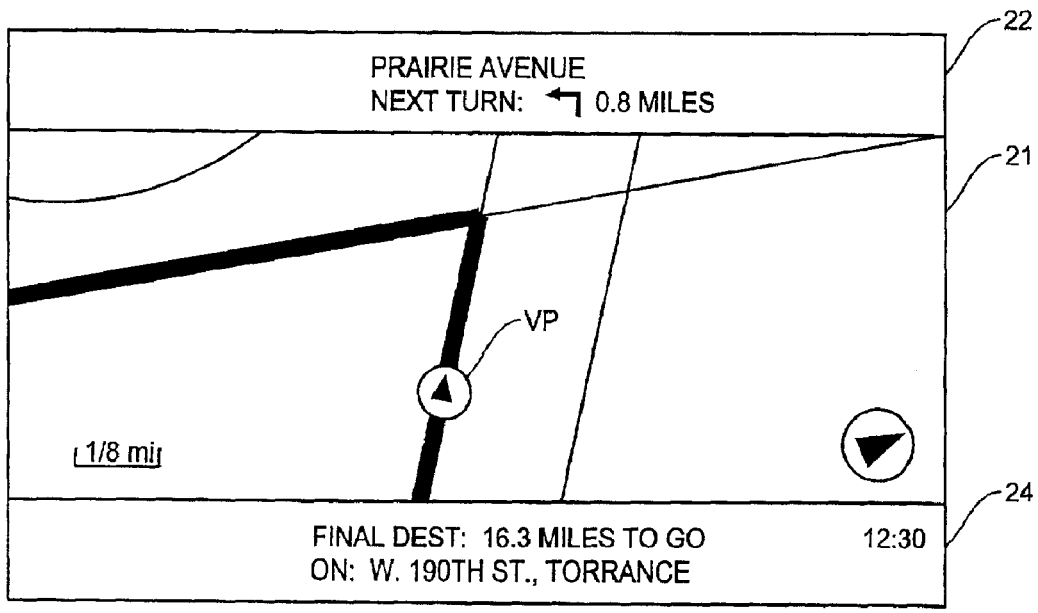

FIG. 2B shows an example of route guidance display which performs the route guidance function. The route guidance display is activated after specifying the destination. In this example, the current street "W 190TH ST" and the left side of the next street "PRAIRIE AVE" will be highlighted in the map image 21 to show the direction of turn at the next intersection. In addition, this example further shows an arrow indicating the direction (left) in which the vehicle is to turn at the intersection in a guidance information box 22 at the top of the screen. The guidance information box 22 also shows the name of the street "PRAIRIE AVE" which intersects with the current street "W 190TH ST" and a distance to the intersection. Thus, the navigation system indicates that the vehicle should make a left turn at the intersection with "PRAIRIE AVE".

Further to the highlighted display, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 2B, a destination must be specified in the navigation system so that the system can find one or more routes to reach the destination. FIGS. 3A–3F show examples of display on the monitor screen during the operation of inputting the destination.

By operating a menu key, a main menu 25 such as shown in FIG. 3A is displayed on the navigation system and a menu item "Destination" is selected from the main menu. This allows the navigation system to display a "Enter Destination by" menu 27 as shown in FIG. 3B for specifying an input method for selecting the destination. The "Enter Destination by" menu 27 lists various methods for selecting the destination including "Address" for specifying the city and address of the destination, "Intersection" for specifying the names of two streets in the city which intersect with one another, and "Point of Interest" for selecting the programmed destination based on the name, category or telephone number.

Other methods in the "Enter Destination by" menu 27 include "Recent Route" for specifying the destination based on the recent destinations saved in the navigation system, "Address Book" for selecting the address of the destination out of the addresses stored in the system, and "Map Cursor" for specifying the destination by pointing a cursor to the destination on the map. For example, the information in the address book is formed of a list of names and addresses of the places that the user frequently visits.

Figure 3D:
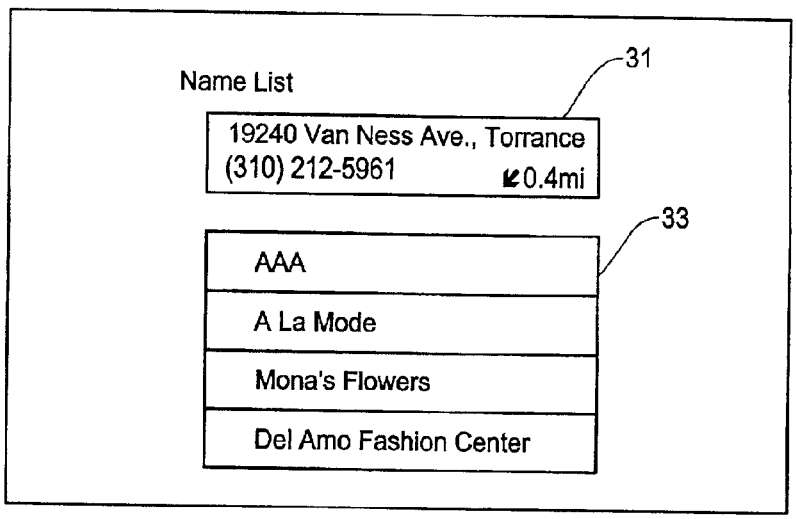
Figure 3E:
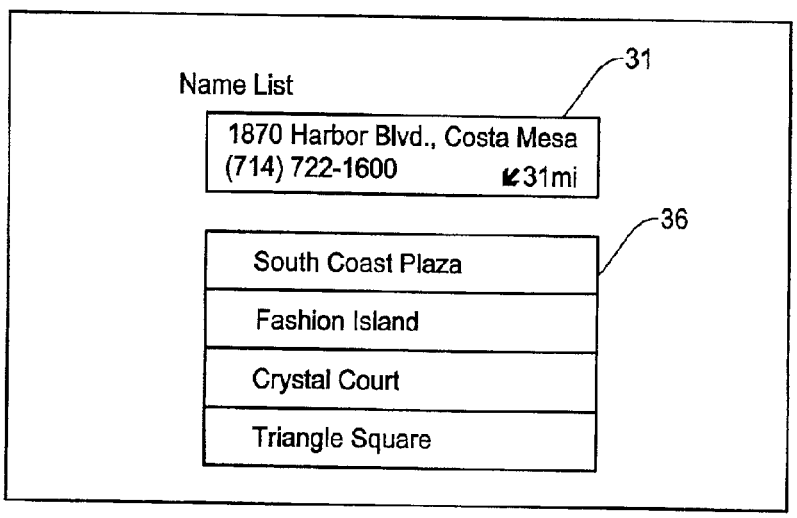
Figure 3F:
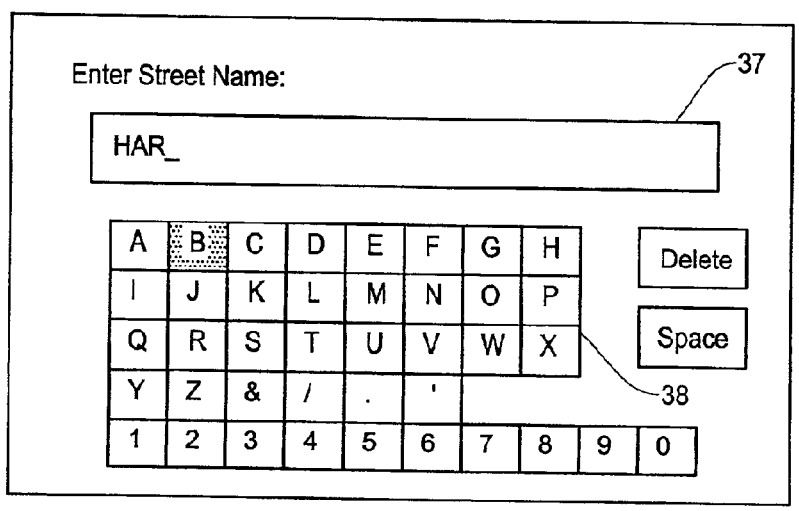

When selecting, for example, the "Point of Interest" in FIG. 3B, the navigation system displays a "Category List" menu 28 such as shown in FIG. 3C. The "Category List" menu 28 contains various different categories such as "Bank", "Restaurant", "Hotel", "Shopping" and others. Supposing the category of "Shopping" is selected, the navigation system displays "Name List" such as shown in FIGS. 3D and 3E. The "Name List" shows names of shops and shopping malls sorted by, for example, distance from the vehicle position. In an address information box 31 on the display, the address and phone number of the highlighted name in the list 33 will be displayed. The address information box 31 may also show the distance to the highlighted shop. Typically, the navigation system stores several tens or hundreds of names of shops within predetermined distances and displays several shops per page of display screen, and a user may scroll the display screen to see other names of the shops in the name list 36 such as shown in FIG. 3E.

When the destination is not prestored in the navigation system, a user can input the destination by selecting, for example, the "Address" method or "Intersection" method in the "Enter Destination by" menu 27 of FIG. 3B. Then, the navigation system displays an "Enter Street Name" shown in FIG. 3F for inputting the city and address in an address input box 37 by means of a key board (keypad) 38 displayed on the monitor screen.

After inputting the destination, the navigation system determines a route to the destination based on, for example, the shortest way to reach the destination, the route using many free ways as possible or the route without using toll road, and the like. Thus, the navigation system moves to the route guidance display such as shown in FIG. 2B which performs the route guidance.

Before going into details of the traffic information and display examples of the present invention, a brief description will be made regarding the basic structure of the navigation system of the present invention with reference to a block diagram of FIG. 4 and an example of remote controller for the navigation system with reference to FIGS. 5A and 5B.

Figure 4:
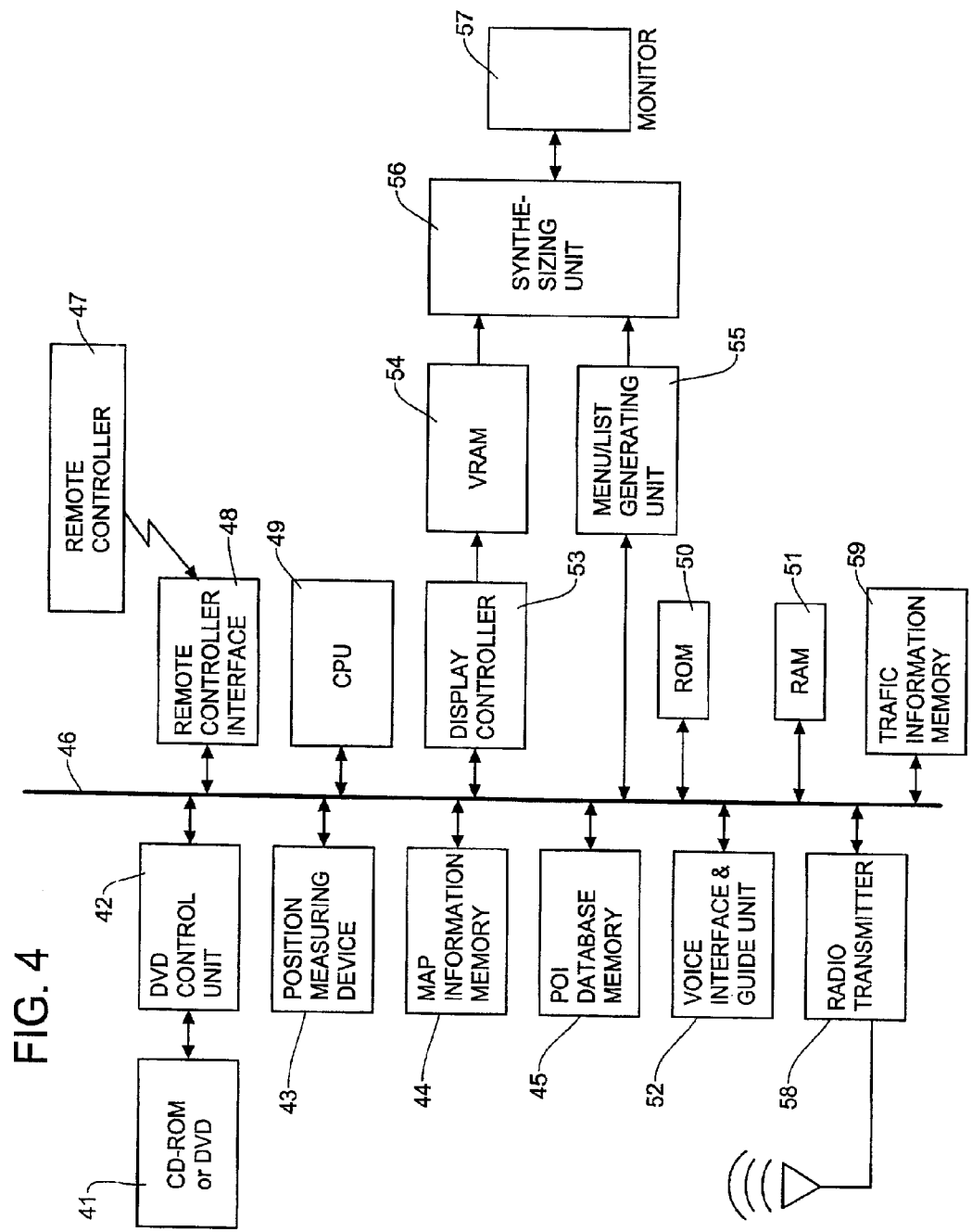
FIG. 4 is a block diagram showing an example of structure in the vehicle navigation system according to the present invention.

In the block diagram of FIG. 4, the navigation system includes a map storage medium 41 such as a CD-ROM, DVD, hard disc or other storage means (hereafter "DVD") for storing map information, a DVD control unit 42 for controlling an operation for reading the map information from the DVD, a position measuring device 43 for measuring the present vehicle position. The position measuring device 43 has a vehicle speed sensor for detecting a moving distance, a gyro for detecting a moving direction, a microprocessor for calculating a position, a GPS receiver, and etc.

The block diagram of FIG. 4 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

Figure 5A:
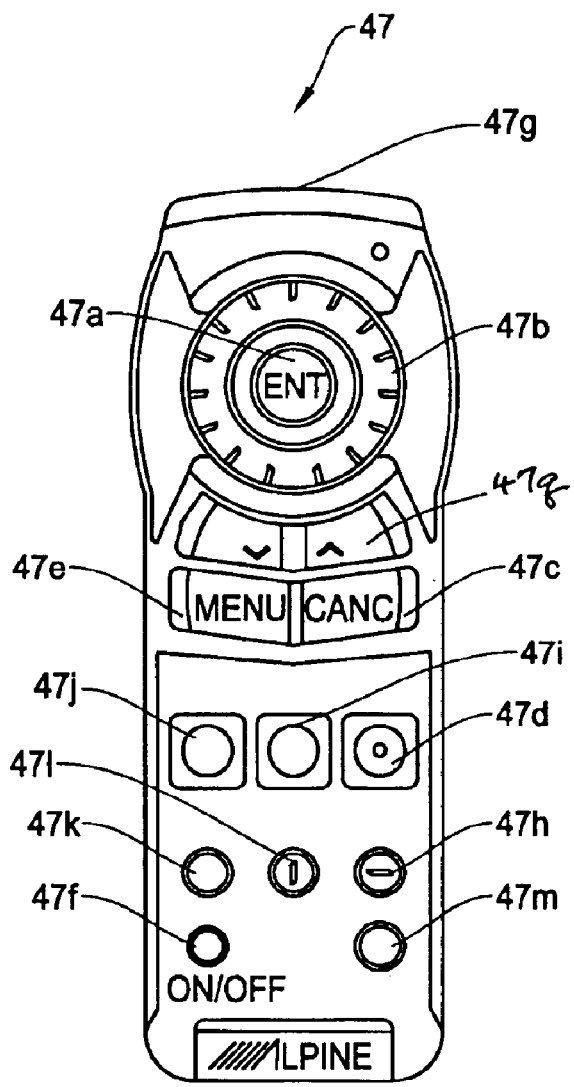
FIGS. 5A and 5B are diagrams showing an example of a remote controller accompanied by the vehicle navigation system of the present invention.
Figure 5B:
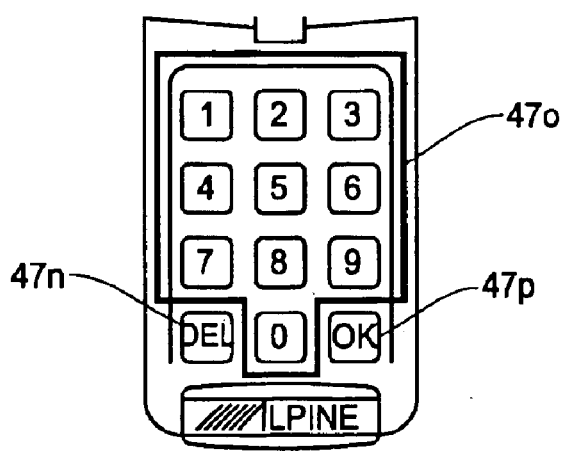

The remote controller 47 has a variety of function keys as shown in FIG. 5A and numeric keys as shown in FIG. 5B. The numeric keys appear when a lid in the lower part of FIG. 4A is opened. The remote controller 47 includes a joystick/ enter key 47a, a rotary encoder 47b, a cancel key 47c, an MP/RG key 47d, a menu key 47e, a zoom/scroll key 47g, a monitor ON/OFF key 47f, a remote control transmitter 47g, a plan key 47h, an N/H key 47i, a voice key 47j, a list key 47k, a detour key 47l, a delete destination key 47m, a delete key 47n, numeric keys 47o, and an OK key 47p.

The joystick/enter key 47a selects highlighted items within the menu and moves map displays and a vehicle position icon. The rotary encoder 47b changes zoom scale, scrolls list pages, moves the cursor, and etc. The cancel key 47c cancels the present displayed screen or is operated when returning the screen to the previous menu screen. The MP/RG key 47d toggles between detailed map display and basic guide display during guidance. The menu key 47e displays the main menu. The plan key 47h deletes the route set by Today's Plan function, the N/H key 47i changes between North-up and Heading-up orientation, and the voice key 47j initiates voice instruction.

Although a remote controller such as described above is a typical example for selecting menus, executing selected functions and etc., the navigation system includes various other input methods to achieve the same and similar operations done through the remote controller. For example, the navigation system includes hard keys and joystick on a head unit of the system mounted on a dash board, touch screen, and voice communication.

Referring back to FIG. 4, the navigation system further includes a bus 46 for interfacing the above units in the system, a processor (CPU) 49 for controlling an overall operation of the navigation system including the traffic information processing in the present invention, a ROM 50 for storing various control programs such as a route search program and a map matching program necessary for navigation control, a RAM 51 for storing a processing result such as a guide route, a voice guiding unit 52 for guiding a traveling direction at a crossroad with spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, and a monitor (display) 57.

The navigation system further includes a radio transmitter 58 for wireless communication with a database service provider, and a traffic information memory 59 for storing the traffic information. The radio transmitter 58 corresponds to the radio transmitters 14 and 16 in FIGS. 1A and 1B. The radio transmitter 58 is typically a long-range wireless transceiver such as a satellite transceiver, FM sub-carrier transmitter or a short-range wireless transmitter such as a Bluetooth transceiver, or other wireless transmitter. The radio transmitter 58 receives traffic data from a service provider or other event data from corresponding service providers through wireless data transmission. The radio transmitter 58 may further be configured to receive various vehicle parameters including mileage, gas levels, oil levels, an air bag sensor or a shock sensor to monitor the current conditions of the vehicle, which is not directly related to the present invention.

Figure 6A:
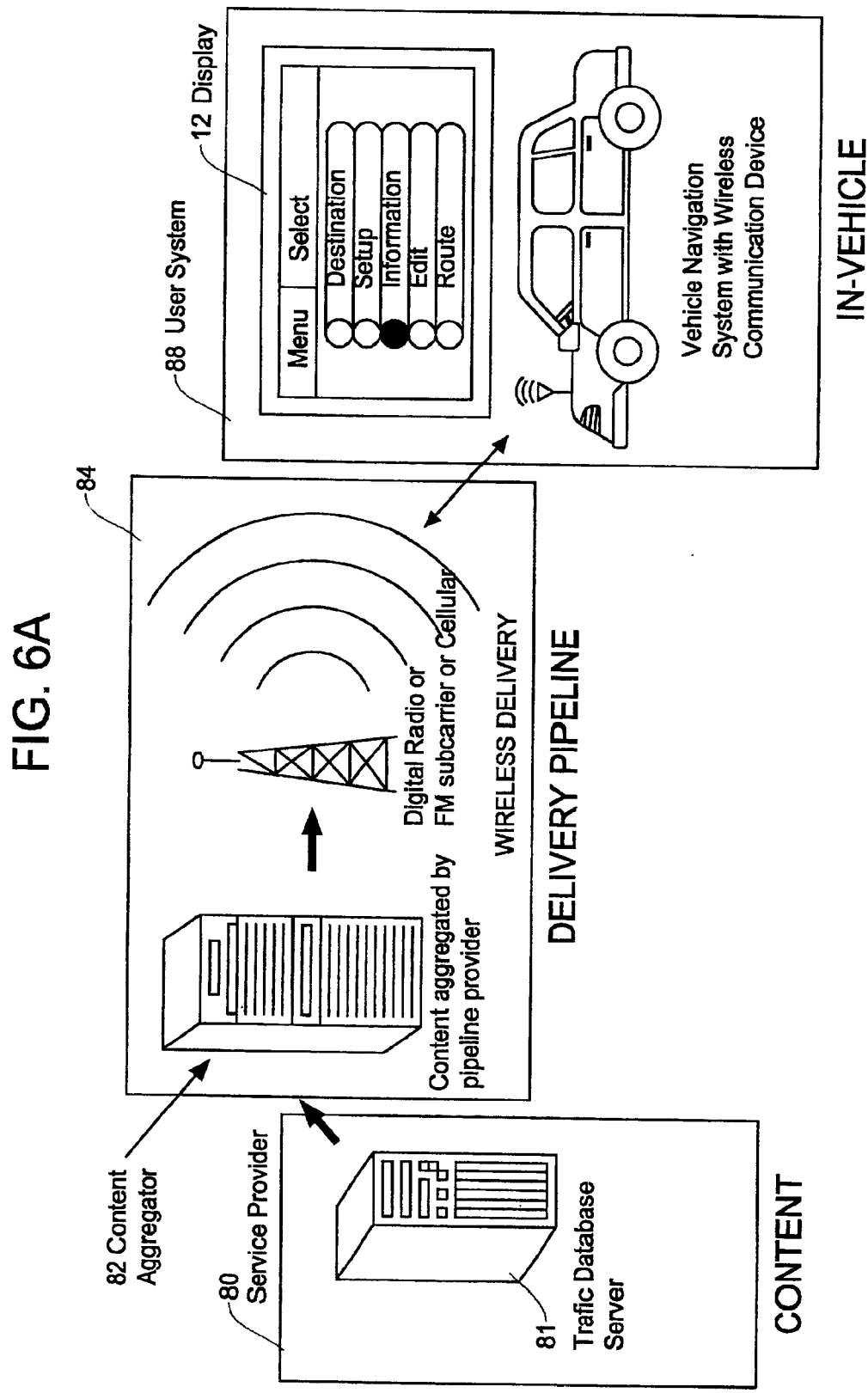
FIG. 6A is a schematic diagram showing an example of overall system involving the traffic information service provider and the navigation system of the present invention including information delivery infrastructures.

An overall system associated with the present invention for receiving and processing the traffic information is shown in FIG. 6A. In this example, the overall system includes a user system 88, typically a vehicle navigation system, described above installed in a vehicle. The overall system further includes a service provider 80 such as a traffic database server 81 and a content aggregator 82, and event data delivery infrastructures (delivery pipeline) in a form of wireless delivery 84.

The traffic database server 81 may be one of many other types of database. An example of other types of database include movies, sports games, dramas, TV programs, races, news, shopping information, and weather forecast. Typically, such databases are aggregated to the content server or content aggregator 82.

An example of the wireless delivery 84 is a radio data transmission network provided by CUE Corporation, Irvine, Calif. Various radio transmission methods are used in the wireless delivery 84, for example, radio satellite transmission, FM sub-carrier transmission, AM radio transmission (digital radio) and the like. The FM sub-carrier transmission and AM radio transmission may also be used to Internet applications for automobile and hand held device.

By selecting an "Information" menu, for example, in the main menu screen of the navigation system display 12, the user system 88 starts communication with the traffic database server 81. The user system 88 receives the traffic information through the wireless delivery 84 and the radio transmitter 58 (FIG. 4). The navigation system processes the traffic data in combination with the position data and the calculated route data to display the traffic incidents in accordance with the present invention.

Figure 6B:
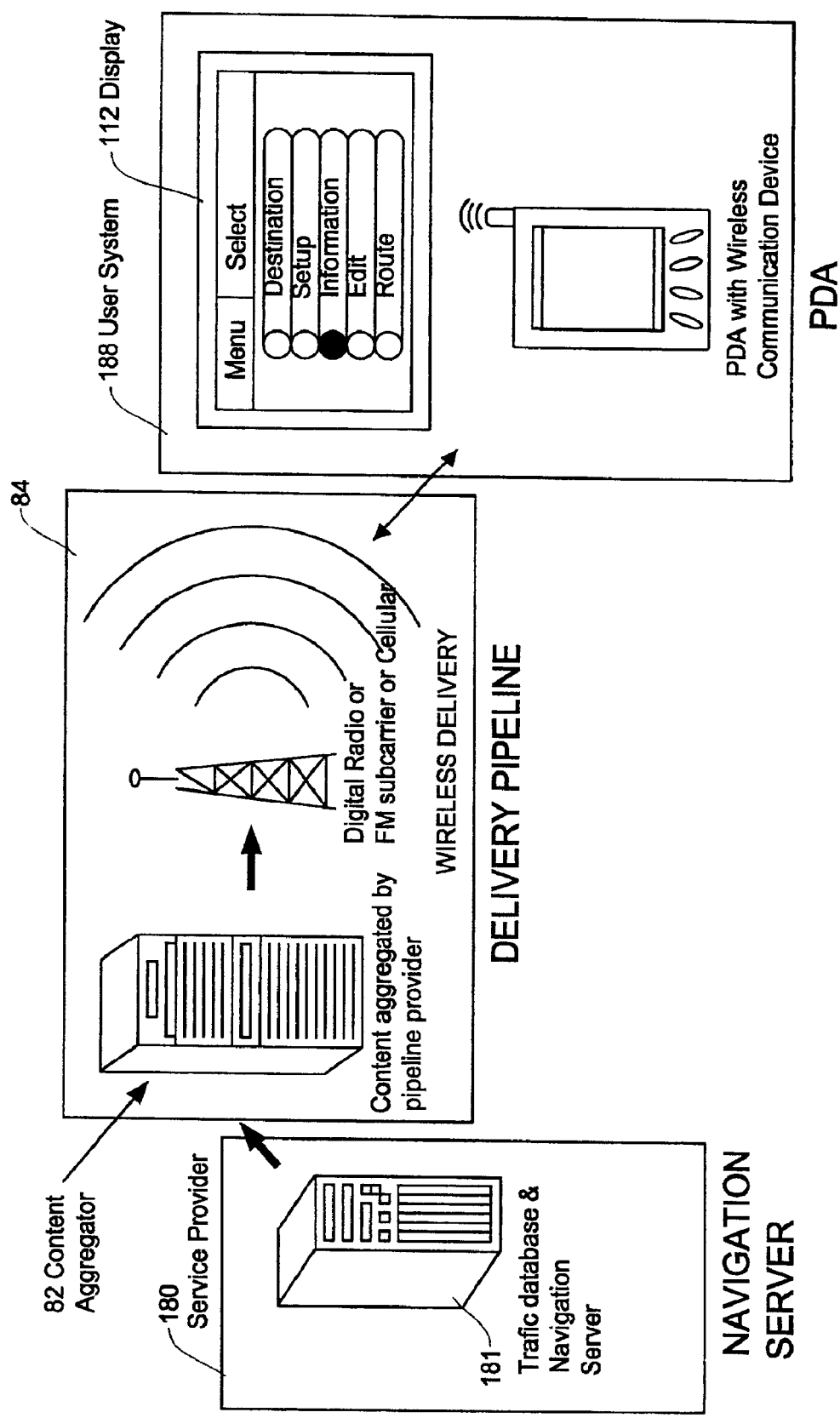
FIG. 6B is a schematic diagram showing another example of overall system involving the navigation service provider and the portable data terminal including the information delivery infrastructures.

FIG. 6B shows another example of the overall system associated with the present invention for receiving and processing the traffic information. This example shows a system suitable for a user having a user system 188 with a relatively small terminal device such as a PDA (personal digital assistant) without a map data storage (DVD) or a high power computer. The PDA has a capability of detecting its position by, for example, a global positioning system (GPS) using artificial satellites.

A service provider 180 has a traffic database and navigation server 181 for performing a navigation function for the user as well as providing traffic information to the user. The traffic database and navigation server 181 has a map data storage and a high power computer to produce map image data or data lists of various types of destination based on the position information from the user. The traffic database and navigation server 181 calculates the route to the destination and guides the user to the destination. In other words, the traffic database and navigation server 181 includes all of the functions of the navigation system.

The PDA receives the navigation data from the traffic database and navigation server 181 through the wireless communication. When the user selects an "Information" menu, for example, on the PDA display 112, the traffic database and navigation server 181 sends the traffic information in combination with the map data and guided route data to the user. Accordingly, the PDA displays the map image with the calculated route and traffic incidents in accordance with the present invention.

FIG. 7 is an example of a route guidance map having traffic incidents icons. When receiving the traffic information through the wireless communication such as shown in FIG. 6A, the navigation system combines the traffic information with the map data. Then, as shown in FIG. 7, the navigation system displays the traffic incident icons on the map at the locations specified by the traffic information. The solid line (highlighted route) indicates a route to the destination intended by the user or a calculated route to the destination produced by the navigation system when the destination is specified. The arrow mark on the calculated route shows a current vehicle position.

In the example of FIG. 7, especially when many traffic incident icons are displayed on the screen, it is difficult for a user to determine which traffic information is important and which is not. In order to find out the details of each traffic incident, the user has to either scroll the cursor to the icon (joystick operation) or accurately touch the icon (touch screen operation). The information on the traffic incident will appear either on a separate screen or on a pop-up window. Other possible methods are to list up all the traffic information on a separate screen or on a pop-up window sorted by distance from the current vehicle position or by incident type. However, all the foregoing methods increase the operation time or steps of search process. It is not possible to instantly grasp the necessary information at a glance.

Figure 8:
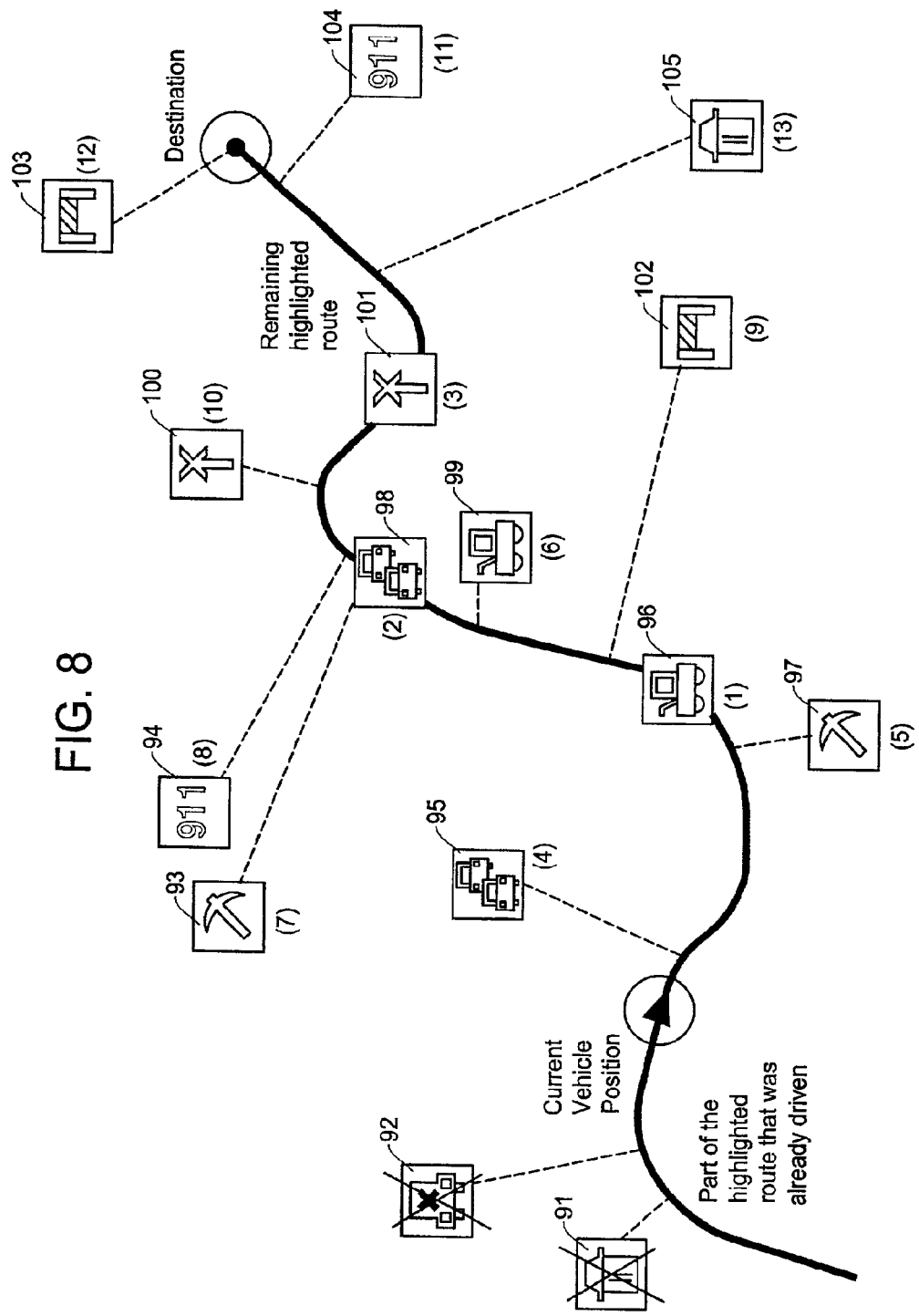
FIG. 8 is a diagram showing an example of method for determining an order of listing the traffic incidents of FIG. 7 where the traffic incidents are selected based on the shortest distances to the intended or calculated route to the destination.

To solve this problem, FIG. 8 shows a method of the present invention to calculate all the traffic information and prioritize the traffic incidents. The traffic incidents will be listed in the order of the priority, i.e., the relevancy to the intended or calculated route. Examples of parameter to be used for prioritizing the traffic incidents include a shortest distance to the calculated route, a distance from the current vehicle position, and past or forthcoming route.

In FIG. 8, the intended or calculated route and the traffic incidents icons are the same as that of FIG. 7. In the method of FIG. 8, the shortest distance between the traffic incident and the calculated route is determined. Each broken line in FIG. 8 indicates such a shortest distance between the corresponding traffic incident and the intended or calculated route. Typically, the shortest distance is a distance on a line from the traffic incident intersecting the route to the destination at a right angle. In this example, traffic incidents 96 (stalled vehicle), 98 (traffic jam) and 101 (railroad crossing) are directly on the calculated route. The cross points of the shortest distance for the traffic incidents 91 (debris) and 92 (accident) are on the route already passed.

Figure 9:
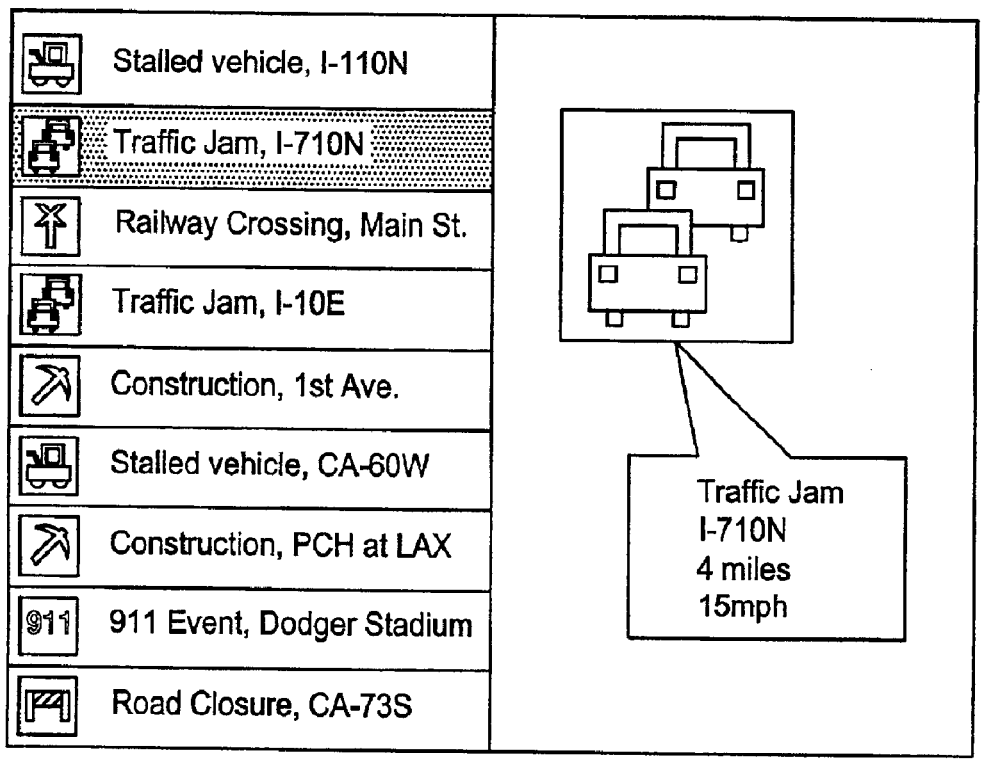
FIG. 9 is a diagram showing a display example for listing the traffic incidents obtained in the order determined by the method of FIG. 8.

For the example of FIG. 8, a traffic incident list such as shown in FIG. 9 is produced by the procedure as follows. First, the navigation system identifies the locations of all the traffic incidents in the coverage area which is dependent upon the current vehicle position. Then, for each traffic incident, the navigation system calculates the shortest distance from the traffic incident to the intended or calculated route and marks the intersection point to the intended or calculated route.

With use of the distances and the intersection points as well as the current vehicle position, the navigation system produces the traffic incident list based on the following:

(1) List all the traffic incidents that occur on the remaining intended or calculated route (with the closest traffic incident to the current vehicle position be listed first).

(2) List all the other traffic incidents that are not occurred on the route where each has the shortest distance to the intended or calculated route within a pre-defined distance and the intersecting point (shortest distance point) intersects the remaining intended or calculated route (with the closet traffic incident to the current vehicle position be listed first), i.e., not the part of the route already passed. Examples of the pre-defined distance are 0.5 mile, 1 mile, 2 mile, and etc., which will be defined by the user or pre-defined in the navigation system.

(3) List all the other traffic incidents that do not match the criteria (1) and (2) (with the closest traffic incident to the current vehicle position be listed first).

By applying the foregoing criteria, the traffic incidents that are on the intended or calculated route are listed first in the order of the distance to the current vehicle position. Namely, the traffic incident 96 (stalled vehicle) is the first in the list, the traffic incident 98 (traffic jam) is the second, and the traffic incident 101 (railroad crossing) is the third in the list. This order is indicated by the numbers in the parentheses of FIG. 8.

Since the other traffic incidents are not occurred on the intended or calculated route, the traffic incidents are listed in the order of the distance from the current vehicle position. In the example of FIG. 8, it is assumed that the shortest distance for each and every traffic incident is within the pre-defined distance.

Thus, the traffic incident 95 (traffic jam) is 4th, the traffic incident 97 (construction) is 5th, the traffic incident 99 (stalled vehicle) is 6th, the traffic incident 93 (construction) is 7th, and the traffic incident 94 ("911" incident) is 8th in the list. Similarly, the traffic incident 102 (road closure) is 9th, the traffic incident 100 (railroad crossing) is 10th, the traffic incident 104 ("911" incident) is 11th, the traffic incident 103 (road closure) is 12th, and the traffic incident 105 (debris) is the last in the list. The traffic incidents 91 (debris) and 92 (accident) will not be listed since the intersecting points are on the route already driven. FIG. 8 shows the order of the traffic incidents by the numbers in the parentheses.

FIG. 9 shows an example of traffic list produced based on the method of FIG. 8. Since the list shows the traffic incidents in the order of relevance (severity) to the intended or calculated route, the user needs to see only one or two traffic incidents in the top of the list. Thus, the user can comprehend the traffic information that is really necessary for his/her driving at a glance of the screen. In the case where the user wants to know more details of the specific traffic incident, the detailed information of the traffic incident specified (highlighted) by the user will be displayed in a manner exemplified in FIG. 9.

Figure 10:
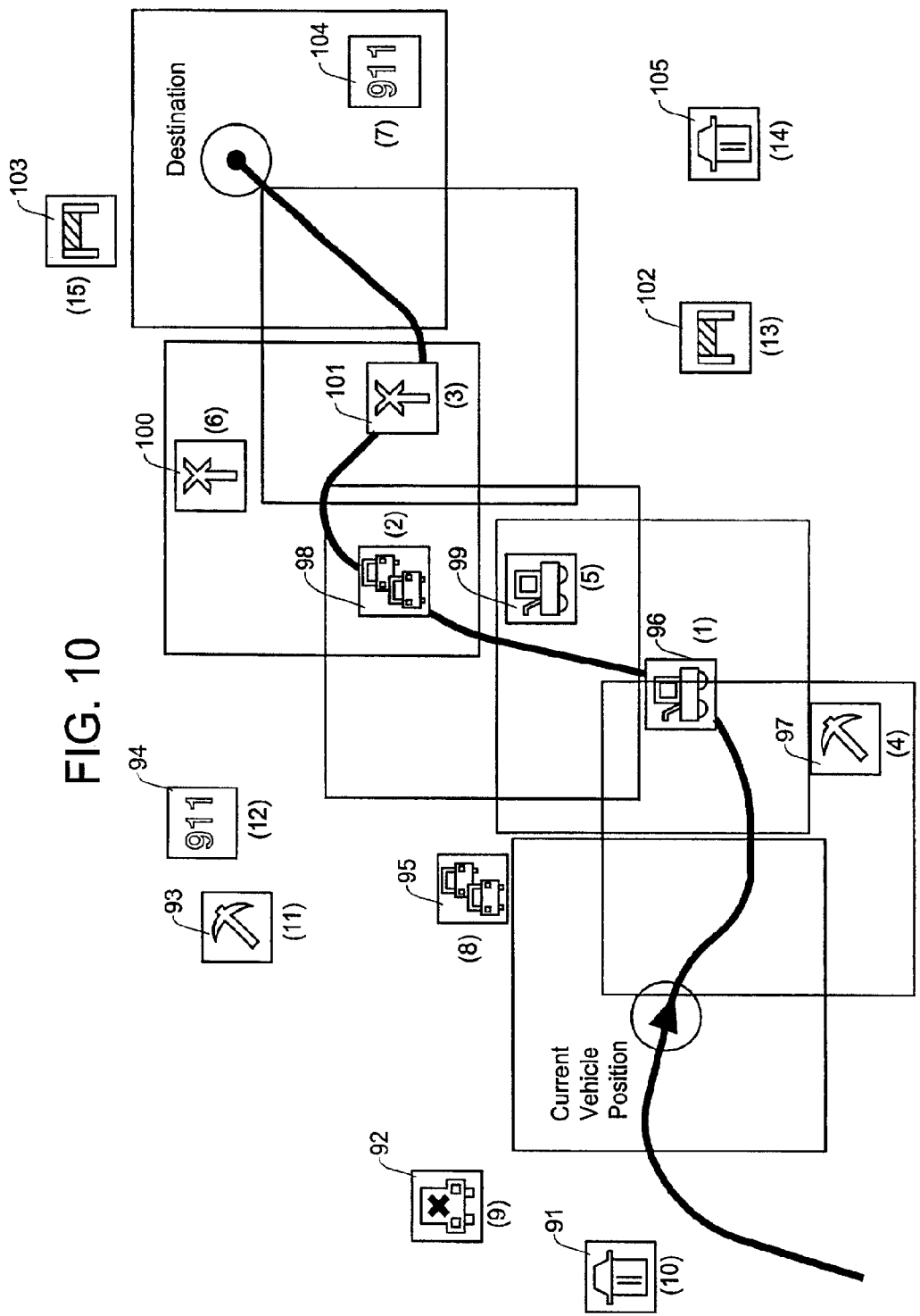
FIG. 10 is a diagram showing another example of method for determining an order of listing the traffic incidents of FIG. 7 where the traffic incidents are selected based on the proximity to the intended or calculated route to the destination.

FIG. 10 shows another method of the present invention to calculate the traffic information and prioritize the traffic incidents for listing the traffic incidents in the order of the relevancy to the intended or calculated route. Instead of determining the shortest distance between each traffic incident and the intended or calculated route in the method of FIG. 8, the method in FIG. 10 determines the proximity of the traffic incidents by defining a square box along the route. The traffic incidents within the predefined square boxes have priority to the traffic incidents outside the square boxes. In FIG. 10, the intended or calculated route and the traffic incidents icons are the same as those of FIGS. 7 and 8.

In the example of FIG. 10, the traffic incident list is produced as follows. First, the navigation system identifies the locations of all the traffic incidents in the coverage area which is dependent upon the current vehicle position. Then, the navigation system creates a predetermined size of a square box, such as a 2 mile by 2 mile box, centered at the current vehicle position. The navigation system finds the cross point on the remaining intended or calculated route where it intersects the square box and create another square box of same size centered at the cross point. The above process is repeated for all of the remaining intended or calculated route. Examples of the size of the square box are 0.5 mile by 05 mule, 1 mile by 1 mile, 2 mile by 2 mile, and etc., which will be defined by the user or pre-defined in the navigation system.

With use of the square boxes created along the route in the foregoing process, the navigation system produces the traffic incident list based on the following:

(1) Identify all the traffic incidents that are located within the square boxes.

(2) List all the traffic incidents that occur on the remaining intended or calculated route and are in the square boxes (with the closest traffic incident to the current vehicle position be listed first).

(3) List all the other traffic incidents that are not occurred on the intended or calculated route but are within the square boxes (with the closet traffic incident to the current vehicle position be listed first).

(4) List all the other traffic incidents that do not match the criteria (2) and (3) (with the traffic incident to the current vehicle position be listed first).

By applying the foregoing criteria, the traffic incidents that are on the intended or calculated route are listed first in the order of the distance to the current vehicle position. Namely, the traffic incidents 96 (stalled vehicle), 98 (traffic jam), and 101 (railroad crossing) are listed in this order in the traffic list. The order is shown in FIG. 10 by the numbers in the parentheses.

Then, the other traffic incidents that are not occurred on the intended or calculated route, but are within the square boxes are listed in the order of the distance from the current vehicle position. Thus, the traffic incidents 97 (construction), 99 (stalled vehicle), 100 (railroad crossing), 104 ("911" incident), are listed in this order. FIG. 10 shows such order of the traffic incidents by the numbers in the parentheses.

Further, the traffic incident outside the square boxes are listed in the order of the distance from the current vehicle position. Thus, the traffic incidents 95 (traffic jam), 92 (accident), 91 (debris), 93 (construction), 94 ("911" incident), 102 (road closure), 105 (debris), and 103 (road closure) are listed in this order. FIG. 10 shows such order of the traffic incidents by the numbers in the parentheses.

Figure 11:
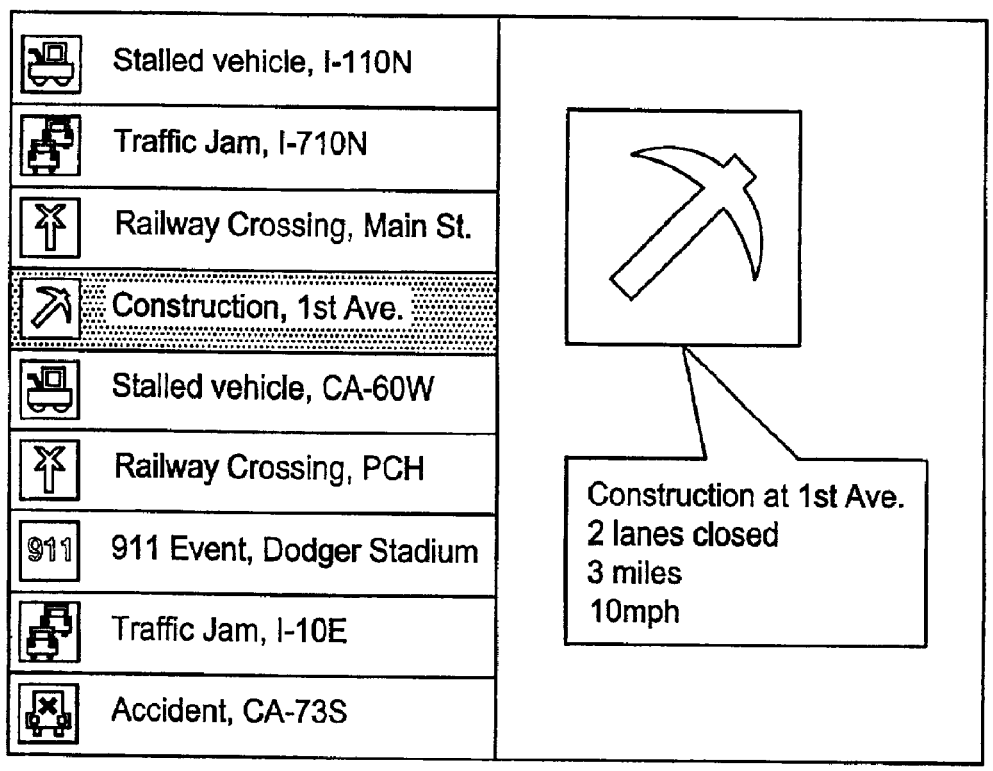
FIG. 11 is a diagram showing a display example for listing the traffic incidents obtained in the order determined by the method of FIG. 10.

FIG. 11 shows an example of a traffic list produced based on the method of FIG. 10. Since the list shows the traffic incidents in the order of relevance (severity) to the intended or calculated route, the user needs to see only one or two traffic incidents in the top of the list. Thus, the user can grasp the traffic condition which is really necessary for his/her driving at a glance of the screen. In the case where the user wants to know more detailed information on the specific traffic incident, the details of the traffic incident specified (highlighted) by the user will be displayed in a manner exemplified by FIG. 11.

FIGS. 12 and 13 show further display examples for listing the traffic incidents and associated information in the order determined by the present invention. As noted above, the higher in the list, the more relevant the traffic incidents to the intended or calculated route. The example of FIG. 12 further shows the information concerning the traffic speed (ex. 25 mph) caused by the particular traffic incident, the length of the jam (ex. 2 ml) caused by the traffic incident, the number of lanes closed (ex. 3 lns) caused by the traffic incident, and the estimated time of clearance (ex. 3:00pm).

In the case where live video of the traffic incident is available, the navigation system of the present invention is able to request the video data to the traffic information server. By downloading the video data, the user is able to see the video image of the traffic incident for determining, for example, the seriousness of the incident. Further, the display example of FIG. 12 includes a "Re-calculation Route" menu for obtaining an optimum route to the destination which is calculated to avoid the traffic incidents specified by the user.

FIG. 14 shows an example of display by the navigation system of the present invention for recalculating the route to the destination by avoiding the traffic incidents specified by the user. By selecting the "Re-calculation Route" menu in the example of FIG. 12 or 13, the navigation system displays a screen such as shown in FIG. 14 for the user to specify the traffic incidents that should be avoided en route to the destination. In the example of FIG. 14, the user specifies the traffic incident to be avoided by providing a check mark in the corresponding boxes on the display. By pressing the enter key, for example, the navigation system calculates to determine the optimum route to the destination which is not affected by the traffic incidents specified by the user.

FIG. 15 shows another embodiment of the present invention for displaying the traffic incidents on the navigation system in a manner to quickly and easily grasp the traffic information at a glance. In the foregoing example, the traffic incidents are listed in the order of relevance (ex. severity) to the intended or calculated route. In the embodiment of FIG. 15, the degrees of such relevance are indicated by the difference in the color of the traffic incident icons.

For example, red, yellow and green may be used for distinguishing the seriousness of the traffic incidents. The traffic incident icon with red color is the most severe one such as directly on the intended or calculated route. In this category, the length of the affected traffic (jam) is long (ex. 4 miles or more) and the traffic speed is low (ex. 15 miles or less). The traffic incident icon with yellow color is less severe incidents than the red incidents in terms of the length of traffic jam (ex. less than 4 miles and more than 1 mile) and traffic speed (higher than 15 miles). The traffic incident icon with green color is the least severe incident, for example, with traffic jam of less than 1 mile, and traffic speed of 30 miles or higher.

FIG. 16 shows a further embodiment of the present invention for displaying the traffic incidents on the navigation system to quickly and easily grasp the traffic information at a glance. In this example, the traffic incident icons are colored based on the traffic information from the service provider. Such color assignment is made solely based on the traffic information received without regard to whether the traffic incident is on the user's intended or calculated route to the destination. The criteria for assigning the color include a size of an area affected by each traffic incident.

The traffic information from the service provider may include data concerning the size of the affected area, traffic speed, anticipated clearance time, length of traffic jam, and etc. The navigation system interprets the degree of seriousness of the traffic incidents and assigns the color to the traffic incidents based on the seriousness. As an example, the color is assigned based on the size of the affected area. For example, when the size of the affected area is large, red color is assigned to the traffic incident and when the size of the affected area is small, green color is assigned to the traffic incident. When the size of the affected area is intermediate, yellow color is assigned to the traffic incident. Since this example does not require to calculate the shortest distances or to apply the square boxes as shown in the foregoing examples, the navigation system can quickly determine the color and display the traffic incidents with the assigned color.

As has been described above, according to the present invention, the navigation system is capable of displaying the traffic incidents in the manner that the user can grasp the traffic incidents quickly and easily by one or two short glances at the screen. The user can attain the severity of the traffic incidents by the order of listing the traffic incidents or by the color of the traffic incident icons without being affected his/her safe driving. Based on the traffic information on the navigation screen, the user can decide whether to change the route or schedule. The navigation system modifies the original route to the destination to avoid the traffic incidents specified by the user. Accordingly, the user can travel to the destination comfortably and with confidence.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A display method for a navigation system, comprising the following steps of:

receiving traffic information through a wireless communication device;

identifying locations of all of traffic incidents contained in the received traffic information in a coverage area which is dependent upon a current position of a user of the navigation system;

calculating a shortest distance from the traffic incident to an intended or calculated route to a destination and marking an intersecting point to the intended or calculated route;

prioritizing the traffic incidents based on parameters including the shortest distance and the intersecting point obtained in the foregoing step; and displaying a list of traffic incidents in an order determined by said step of prioritizing the traffic incidents.

2. A display method for a navigation system as defined in claim 1, wherein said step of prioritizing the traffic incidents includes a step of determining whether the traffic incident is on the intended or calculated route to the destination and, assigning highest priority to the traffic incidents on the intended or calculated route and, listing the traffic incidents on the intended or calculated route in an order of distance from the current position of the user of the navigation system.

3. A display method for a navigation system as defined in claim 1, wherein said step of prioritizing the traffic incidents includes a step of evaluating the shortest distance for each of the traffic incidents and comparing the shortest distance with a predetermined distance and assigning higher priority to the traffic incidents whose shortest distance is within the predetermined distance.

4. A display method for a navigation system as defined in claim 1, wherein said step of prioritizing the traffic incidents includes a step of evaluating the shortest distance for each of the traffic incidents and comparing the shortest distance with a predetermined distance and assigning higher priority to the traffic incidents whose shortest distance is within the predetermined distance, and a step of listing the traffic incidents within the predetermined distance in an order of distance from the current position of the user of the navigation system.

5. A display method for a navigation system as defined in claim 1, wherein said step of prioritizing the traffic incidents includes a step of evaluating the intersection point and removing the traffic incident from listing in the traffic incident list when the intersecting point is on the intended or calculated route already passed.

6. A display method for a navigation system as defined in claim 1, wherein said step of prioritizing the traffic incidents comprising the following steps of:
    determining whether the traffic incidents are on the intended or calculated route to the destination and listing the traffic incidents on the intended or calculated route in an order of distance from the current position of the user of the navigation system;
    evaluating the shortest distance for each of the traffic incidents that is not on the intended or calculated route and comparing the shortest distance with a predetermined distance and listing the traffic incidents within the predetermined distance in an order of distance from the current position of the user of the navigation system;
    evaluating the intersection point and removing the traffic incident from listing in the traffic incident list when the intersecting point is on the intended or calculated route already passed; and
    listing all of the remaining traffic incidents in an order of distance from the current position of the user of the navigation system.

7. A display method for a navigation system as defined in claim 1, wherein said step of displaying the traffic list includes a step of displaying information on a traffic speed associated with the traffic incident, a traffic length associated with the traffic incident, or an estimated clearance time of the traffic incident.

8. A display method for a navigation system as defined in claim 1, further comprising a step of calculating an optimum route to the destination while avoiding a particular traffic incident.

9. A display method for a navigation system as defined in claim 1, wherein said step of displaying the traffic incidents includes a step of assigning colors to traffic incidents icons based on the priority determined by said step of prioritizing the traffic incidents.

10. A display method for a navigation system as defined in claim 9, wherein said step of assigning the colors to the traffic incident includes a step of assigning red to the traffic incident in higher priority, yellow to the traffic incident in intermediate priority, and green to the traffic incident in lower priority.

11. A display method for a navigation system, comprising the following steps of:
    receiving traffic information through a wireless communication device;
    identifying locations of all of traffic incidents contained in the received traffic information in a coverage area which is dependent upon a current position of a user of the navigation system;
    creating a predetermined size of square box centered at a current position of the navigation system;
    finding a cross point on an intended or calculated route remaining to a destination which intersects with the square box and creating another square box of same size centered at the cross point;
    repeating the foregoing steps for all of the remaining intended or calculated route;
    prioritizing the traffic incidents based on parameters including whether or not the traffic incident is within the square boxes created in the foregoing step; and
    displaying a list of traffic incidents in an order determined by said step of prioritizing the traffic incidents.

12. A display method for a navigation system as defined in claim 11, wherein said step of prioritizing the traffic incidents includes a step of identifying all the traffic incidents that are located within the square boxes, assigning highest priority to the traffic incidents on the intended or calculated route and within the square boxes, and listing the resultant traffic incidents in an order of distance from the current position of the user of the navigation system.

13. A display method for a navigation system as defined in claim 11, wherein said step of prioritizing the traffic incidents includes a step of identifying all the traffic incidents that are located in the square boxes and are not on the intended or calculated route to the destination and listing the traffic incidents identified in the foregoing in an order of distance from the current position of the user of the navigation system.

14. A display method for a navigation system as defined in claim 11, wherein said step of prioritizing the traffic incidents comprising the following steps of:
    identifying the traffic incidents that are on the intended or calculated route to the destination and within the square boxes and listing the identified traffic incidents in an order of distance from the current position of the user of the navigation system;
    identifying the traffic incidents that are not on the intended or calculated route to the destination and within the square boxes and listing the identified traffic incidents in an order of distance from the current position of the user of the navigation system; and
    listing all of the remaining traffic incidents in an order of distance from the current position of the user of the navigation system.

15. A display method for a navigation system as defined in claim 11, wherein said step of displaying the traffic list includes a step of displaying information on a traffic speed associated with the traffic incident, a traffic length associated with the traffic incident, or an estimated clearance time of the traffic incident.

16. A display method for a navigation system as defined in claim 11, further comprising a step of calculating an optimum route to the destination while avoiding a particular traffic incident.

17. A display method for a navigation system as defined in claim 11, wherein said step of displaying the traffic incidents includes a step of assigning colors to traffic incidents icons based on the priority determined by said step of prioritizing the traffic incidents.

18. A display method for a navigation system as defined in claim 17, wherein said step of assigning the colors to the traffic incident includes a step of assigning red to the traffic incident in higher priority, yellow to the traffic incident in intermediate priority, and green to the traffic incident in lower priority.

19. A display apparatus for a navigation system, comprising:
- means for receiving traffic information through a wireless communication device;
- means for identifying locations of all of traffic incidents contained in the received traffic information in a coverage area which is dependent upon a current position of a user of the navigation system;
- means for calculating a shortest distance from the traffic incident to an intended or calculated route to a destination and marking an intersecting point to the intended or calculated route;
- means for prioritizing the traffic incidents based on parameters including the shortest distance and the intersecting point obtained in the foregoing processes; and
- means for displaying a list of traffic incidents in an order determined by said means for prioritizing the traffic incidents.

20. A display apparatus a navigation system as defined in claim 19, wherein said means for prioritizing the traffic incidents includes means for determining whether the traffic incident is on the intended or calculated route to the destination, assigning highest priority to the traffic incidents on the intended or calculated route, and listing the traffic incidents on the intended or calculated route in an order of distance from the current position of the user of the navigation system.

21. A display apparatus for a navigation system as defined in claim 19, wherein said means for prioritizing the traffic incidents comprising:
- means for determining whether the traffic incidents are on the intended or calculated route to the destination and listing resultant the traffic incidents in an order of distance from the current position of the user of the navigation system;
- means for evaluating the shortest distance for each of the traffic incidents that is not on the intended or calculated route and comparing the shortest distance with a predetermined distance and listing the traffic incidents within the predetermined distance in an order of distance from the current position of the user of the navigation system;
- means for evaluating the intersection point and removing the traffic incident from listing in the traffic incident list when the intersecting point is on the intended or calculated route already passed; and
- means for listing all of the remaining traffic incidents in an order of distance from the current position of the user of the navigation system.

22. A display apparatus for a navigation system as defined in claim 19, wherein said means for displaying the traffic list includes means for displaying information on a traffic speed associated with the traffic incident, a traffic length associated with the traffic incident, or an estimated clearance time of the traffic incident.

23. A display apparatus for a navigation system as defined in claim 19, wherein said means for displaying the traffic incidents includes means for assigning colors to traffic incidents icons based on the priority determined by said means for prioritizing the traffic incidents.

24. A display apparatus for a navigation system, comprising:
- means for receiving traffic information through a wireless communication device;
- means for identifying locations of all of traffic incidents contained in the received traffic information in a coverage area which is dependent upon a current position of a user of the navigation system;
- means for creating a predetermined size of square box centered at a current position of a user of the navigation system;
- means for finding a cross point on an intended or calculated route remaining to a destination which intersects with the square box and creating another square box of same size centered at the cross point and repeating the foregoing processes for all of the remaining intended or calculated route;
- means for prioritizing the traffic incidents based on parameters including whether or not the traffic incident is within the square boxes created in the foregoing processes; and
- means for displaying a list of traffic incidents in an order determined by said means for prioritizing the traffic incidents.

25. A display apparatus for a navigation system as defined in claim 24, wherein said means for prioritizing the traffic incidents comprising:
- means for identifying the traffic incidents that are on the intended or calculated route to the destination and within the square boxes and listing the identified traffic incidents in an order of distance from the current position of the user of the navigation system;
- means for identifying the traffic incidents that are not on the intended or calculated route to the destination and within the square boxes and listing the identified traffic incidents in an order of distance from the current position of the user of the navigation system; and
- means for listing all of the remaining traffic incidents in an order of distance from the current position of the user of the navigation system.

26. A display method for a vehicle navigation system, comprising the following steps of:
- receiving vehicle traffic information through a wireless communication device;
- identifying locations of all of traffic incidents contained in the received vehicle traffic information in a coverage area which is dependent upon a current position of a user of the vehicle navigation system;
- interpreting the vehicle traffic information for each traffic incident to determine a degree of seriousness in affecting traffic conditions;
- assigning colors to traffic incident icons representing types of the traffic incidents based on the degrees of seriousness; and
- displaying the traffic incident icons in the coverage area with the assigned colors on a screen of the vehicle navigation system which guides the user to a destination along a calculated route.

27. A display method for a vehicle navigation system as defined in claim 26, wherein said step of interpreting the vehicle traffic information includes a step of interpreting the information including a size of an affected area, a traffic speed, an anticipated clearance time, and a length of traffic jam for each traffic incident.

28. A display apparatus for a vehicle navigation system, comprising:
- means for receiving vehicle traffic information through a wireless communication device;
- means for identifying locations of all of traffic incidents contained in the received vehicle traffic information in a coverage area which is dependent upon a current position of a user of the vehicle navigation system;

means for interpreting the vehicle traffic information for each traffic incident to determine a degree of seriousness in affecting traffic conditions;

means for assigning colors to traffic incident icons representing types of the traffic incidents based on the degrees of seriousness; and means for displaying the traffic incident icons in the coverage area with the assigned colors on a screen of the vehicle navigation system which guides the user to a destination along a calculated route.

29. A display apparatus for a vehicle navigation system as defined in claim 28, wherein said means for interpreting the vehicle traffic information includes means for interpreting the information including a size of an affected area, a traffic speed, an anticipated clearance time, and a length of traffic jam for each traffic incident.

* * * * *